United States Patent [19]

Shono et al.

[11] 4,396,272
[45] Aug. 2, 1983

[54] APERTURE CONTROL MECHANISM

[75] Inventors: Tetsuji Shono; Hiroshi Kurei, both of Tokyo, Japan

[73] Assignee: Asahi Kogaku Kogyo Kabushiki Kaisha, Tokyo, Japan

[21] Appl. No.: 320,148

[22] Filed: Nov. 10, 1981

[30] Foreign Application Priority Data

Nov. 17, 1980 [JP] Japan ............................... 55-161762

[51] Int. Cl.³ .......................... G03B 9/02; G03B 7/20
[52] U.S. Cl. ...................................... 354/271; 354/46
[58] Field of Search ................... 354/40, 46, 230-232, 354/228, 270, 271, 272, 274

[56] References Cited

U.S. PATENT DOCUMENTS

| 2,929,308 | 3/1960 | Swarofsky | 354/274 |
| 3,961,339 | 6/1976 | Akiyama | 354/272 X |
| 4,336,990 | 6/1982 | Flöther | 354/46 X |
| 4,344,688 | 8/1982 | Metabi | 354/272 |

*Primary Examiner*—Donald A. Griffin
*Attorney, Agent, or Firm*—Sughrue, Mion, Zinn, Macpeak & Seas

[57] ABSTRACT

An abutment pin is provided for defining the fully open position of the aperture release member on an interchangeable lens. The aperture drive member on the camera is biased toward the abutment pin so that the rest position of the drive member will always correspond to a fully open aperture regardless of lens misalignment. The aperture stop down is then controlled by measuring the movement of the drive member from its rest, or start, position.

7 Claims, 3 Drawing Figures

APERTURE CONTROL MECHANISM

BACKGROUND OF THE INVENTION

This invention relates to an aperture control mechanism in an interchangeable lens single lens reflex camera.

In a conventional interchangeable lens single lens reflex camera, the aperture drive member on the camera side is engaged with an aperture release member on the interchangeable lens side to automatically stop down the lens. In a camera having a so-called "EE function" wherein the aperture diameter of the interchangeable lens is set by data from the camera side, the position of the aperture release member on the lens side, which release member is urged by a spring or the like, is controlled by suitably changing the position of the aperture drive member on the camera side according to data provided during the stop down operation, to thereby control the aperture diameter.

In such a control system, the relationship between the position of the aperture drive member and the aperture diameter is, in general, fixed. Therefore, when the interchangeable lens is mounted on the camera and a positional mounting error occurs, the aperture diameter may not be correctly controlled because the aperture release member and the aperture drive member may not both be in their proper relative positions. This problem may also arise due to manufacturing errors or the wear of the aperture release plate and the aperture drive member.

SUMMARY OF THE INVENTION

An object of this invention is to provide an aperture control mechanism which can correctly control an aperture diameter even if the above-described errors are caused.

Briefly, this is achieved by providing a stopper member on the lens for defining the fully open position of the aperture release member. The aperture drive member on the camera is biased to urge the aperture release member against the stopper so that regardless of the mounting or other positional errors, the aperture drive member will always begin its stop down movement from a position corresponding to a fully open aperture. The stop down operation is then controlled by monitoring the amount of movement of the aperture drive member from its starting position.

BRIEF DESCRIPTION OF THE DRAWINGS

Preferred embodiments of the invention will now be described with reference to the accompanying drawings, in which.

DESCRIPTION OF THE PREFERRED EMBODIMENTS

Figures 1, 2:
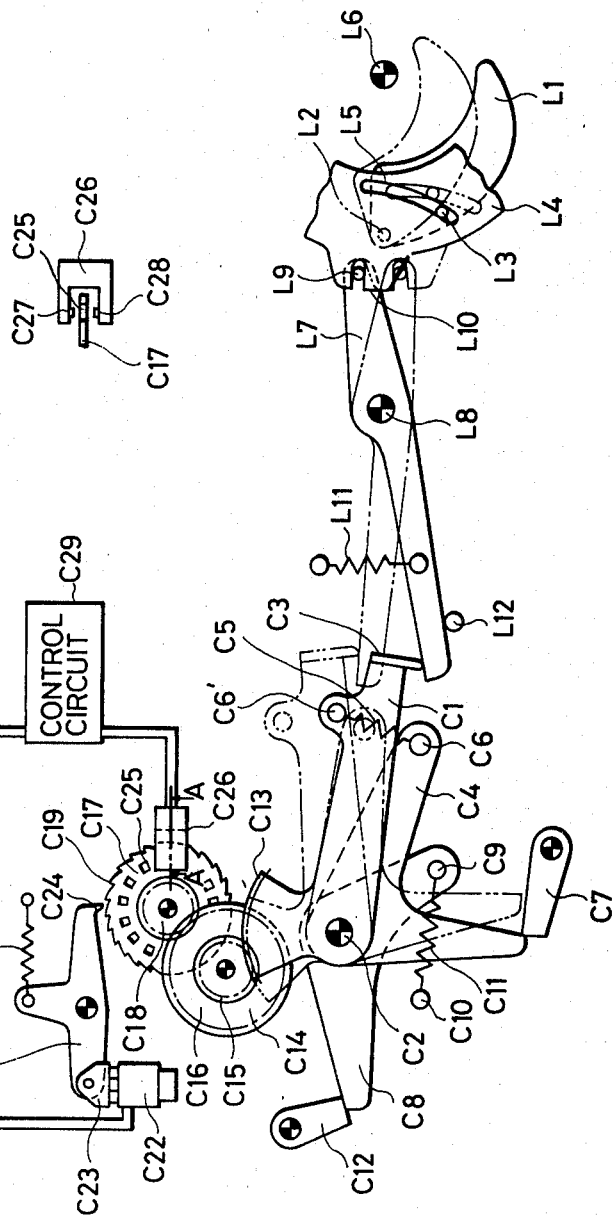
FIG. 1 is an explanatory diagram showing a state of an interchangeable lens single lens reflex camera in which the lens is stopped down with an elastic force provided in the lens.
FIG. 2 is a sectional view taken along line A—A in each of FIGS. 1 and 3.

FIG. 1 shows a state of an interchangeable lens single lens reflex camera (hereinafter referred to merely as "a camera") on which is mounted an interchangeable lens (hereinafter referred to merely as "a lens") which is stopped down by a spring provided in the lens. More specifically, FIG. 1 shows an aperture blade section spread out which in reality should be perpendicular to the drawing.

An aperture blade L1 is pivotally mounted on a lens mirror box (not shown) by a pin L2 embedded in the aperture blade L1. A pin L3 embedded in the other side of the aperture blade L1 is slidably placed in a cam groove L5 cut in an aperture opening and closing ring L4. The ring L4 is rotatably supported in the mirror box, so that it can turn around the optical axis L6 of the lens. Therefore, as the ring L4 is turned counterclockwise about the optical axis L6 in FIG. 1, the aperture blade L1 is turned counterclockwise so that the lens is stopped down to a desired aperture value. An aperture release member L7 is pivotally mounted on a shaft L8. The shaft L8 is provided on a lens mount (not shown) which is secured to the mirror barrel through a straight helicoid mechanism (not shown) employed for focus control. A pin L9 embedded in one end portion of the aperture release member L7 is pivotally fitted in a groove L10 cut in a portion which is protruded from the periphery of the aperture opening and closing ring L4. Therefore, controlling the position of the aperture release member L7 will control the position of the ring L4, whereby the position of the aperture blade L1 will also be controlled. Accordingly, as the position of the aperture release member L7 is changed, the aperture diameter is changed. A lens stopping spring L11 is connected between the other end portion of the aperture release member L7 and the lens mount to urge the aperture release member L7 to move the aperture blade L1 in the lens stopping down direction. A stopper L12 is fixedly provided on the lens mount and near the other end portion of the aperture release member L7 so that the aperture release member L7 may not be moved beyond the position (indicated by the solid line in FIG. 1) where the aperture release member L7 fully opens the aperture blade L1.

The aperture control mechanism on the lens side is constructed as described above. Now, the aperture control mechanism on the camera side will be described. An aperture drive member C1 is pivotally mounted on a shaft C2 which is fixedly secured to one side (not shown) of the mirror box. The drive member C1 has a bent portion C3 at one end, which is engaged with the other end portion of the above-described aperture release member L7. An operating lever C4 is provided below the drive member C1 and is pivotally mounted on the aforementioned shaft C2. A follow spring C5 stronger than the above-described lens stopping spring L11 is connected between spring hooks C6 and C6' which are provided on the operating level C4 and the aperture drive member C1, respectively. The operating lever C4 is normally locked by a locking member C7 which is pivotally mounted on the mirror box.

Thus, under the normal conditions, the aperture drive member C1 is urged to turn by the elastic force of the follow spring C5, to cause the aperture release member L7 to turn counterclockwise against the elastic force of the lens stopping spring L11 until the member L7 abuts against the stopper L12 as indicated by the solid line. That is, the aperture release member L7 normally is retained at the stopper L12.

A restoring lever C8 is provided below the operating lever C4, and it is pivotally mounted on the shaft C2 on which the aperture drive member C1 and the operating lever C4 are also pivotally mounted as described above. A restoring spring C11 is connected between a spring hook C9 provided on one end portion of the restoring lever C8 and a spring hook C10 provided on the mirror box. Therefore, the restoring lever C8 is urged to turn clockwise by the spring C11; however, it is normally locked in the position shown in FIG. 1 by a locking member C12 which is pivotally mounted on the mirror box.

The aperture drive member C1 has a sector-shaped gear C13 at the other end. A double gear C14 pivotally mounted on the mirror box has first and second gears C15 and C16. The number of teeth of the first gear C15 is smaller than that of the second gear C16, and the sector-shaped gear C13 is engaged with the first gear C15. The second gear C16 is engaged with a gear C18 which is integral with a pulse generating member, or a pulse generating board C17, which is pivotally mounted on the mirror box. The motion of the aperture drive member C1 is accelerated by an accelerating gear train consisting of the double gear C14 and the gear C18 integral with the pulse generating board C17, to turn the pulse generating board C17.

The circumference of the pulse generating board C17 is formed into a ratchet wheel C19 provided with a ratchet pawl lever C20. The pawl lever C29 is pivotally mounted on the mirror box, and is urged by a spring C21 to turn towards the ratchet wheel C19; however, the latching pawl C24 at the end of the lever C20 is normally positioned out of engagement with the wheel C19 because a movable piece C23 provided at one end of the pawl lever C20 is attracted by a combination magnet C22 having a permanent magnet, the attraction force of which is eliminated only when electric current is applied.

Pulse generating holes C25 are formed in the peripheral portion of the pulse generating board C17 at equal intervals, so that light is allowed to pass through the holes to provide pulses in a well known manner. A U-shaped detector C26 is disposed near the pulse generating board C17 in such a manner that the peripheral portion of the board C17 where the pulse generating holes C25 are formed is between both sides of the detector C26 as shown in FIG. 2. A light emitting element C27 and a light receiving element C28 are provided on both sides of the detector C26 in such a manner that light emitted by the light emitting element C27 goes through each pulse generating hole C25 to the light receiving element C28. Therefore, when the pulse generating board C17 is turned by the operation of the aperture drive member C1, an electrical pulse signal representative of the amount of rotation of the pulse generating board C17 is applied to a control circuit C29 by the light receiving element C28.

When the camera is released, a release signal is applied to the control circuit C29. As a result, the detector C26 is enabled to provide the pulses, and the locking member C7 is turned counterclockwise to disengage from the operating lever C4. Therefore, the operating lever C4 starts turning counterclockwise with the aid of the elastic force of the follow spring C5. When the edge of the aperture drive member C1 abuts against the spring hook C6 of the operating lever C4, the urging force of the follow spring C5 is eliminated, and instead the force of the lens stopping spring L11 becomes effective to turn the aperture release member L7 clockwise. As a result, the aperture drive member C1 together with the operating lever C4 is turned counterclockwise while the aperture opening and closing ring L4 is turned, so that the aperture blade L is turned counterclockwise while the aperture blade L is turned counterclockwise to start stopping down the lens. In this operation, the pulse generating board C17 is turned through the accelerating gear train in association with the operation of the aperture drive member C1, so that an electrical pulse signal is applied to the control circuit C29 by the detector C26. The control circuit counts the pulses thus applied, and when the count value of the control circuit C29 reaches a number of pulses corresponding to a desired aperture diameter, the control circuit C29 energizes the combination magnet C22. As a result, the combination magnet C22 is disconnected from the movable piece C23, and therefore the ratchet wheel C19 is latched by the latch wheel C24 of the latch lever C20 so that the rotation of the pulse generating board C17 is stopped. At the same time, the aperture drive member C1 is stopped as indicated by the two-dot chain line in FIG. 1, for instance. Therefore, the aperture release member L7 and the aperture opening and closing ring L4 are also stopped as indicated by the two-dot chain line in FIG. 1. Thus, the aperture blade L1 has been moved to provide the desired aperture diameter.

In association with the above-described lens stopping operation, the mirror (not shown) is raised, and then the shutter is operated, whereupon the locking member C12 is turned clockwise to disengage from the restoring lever, while the latch lever C20 is turned counterclockwise to disengage from the pulse generating board C17. Therefore, the restoring lever C8 is turned clockwise by the spring C11. When the spring hook C9 provided at the end portion of the restoring lever C8 abuts against the edge of the operating lever C4, the operating lever C4 is turned by the force of the restoring spring C11 against the force of the lens stopping spring L11. As a result, the aperture drive member C1, the aperture release member L7, the aperture opening and closing ring L4 and the aperture blade L1 are restored to the position indicated by the solid lines in FIG. 1.

To illustrate the advantages of the present invention, it will be assumed that, in the above-described arrangement, the members on the lens side, including the stopper pin L12, are slightly moved upwardly in FIG. 1 because the lens has been mounted on the camera in error. In this case, a force due to spring C5 will act downwardly on the aperture release member L7 through the aperture drive member C1. However, since the aperture release member L7 is detained by the stopper L12, and cannot move downwardly, the aperture drive member C1 will be held in a raised position with the following spring C5 being elongated by this extra amount. That is, the aperture drive member C1, the follow spring C5 and the pulse generating board C17 rotating through the gear train on the camera side will all be moved owing to the above-described lens mounting error.

Subsequently, no matter from what position the pulse generating board C17 starts its rotation, the detector C26 provides a number of pulses corresponding accurately to the amount of operation of the aperture drive member C1. Therefore, even if the aperture drive member C1 is shifted from its standard position by the aperture release member L7 when the lens is mounted, a desired aperture diameter can be obtained at all times if the aperture release member L7 is engaged with the aperture drive member C1 and is positioned by the stopper L12 to fully open the aperture blade L1.

Figure 3:
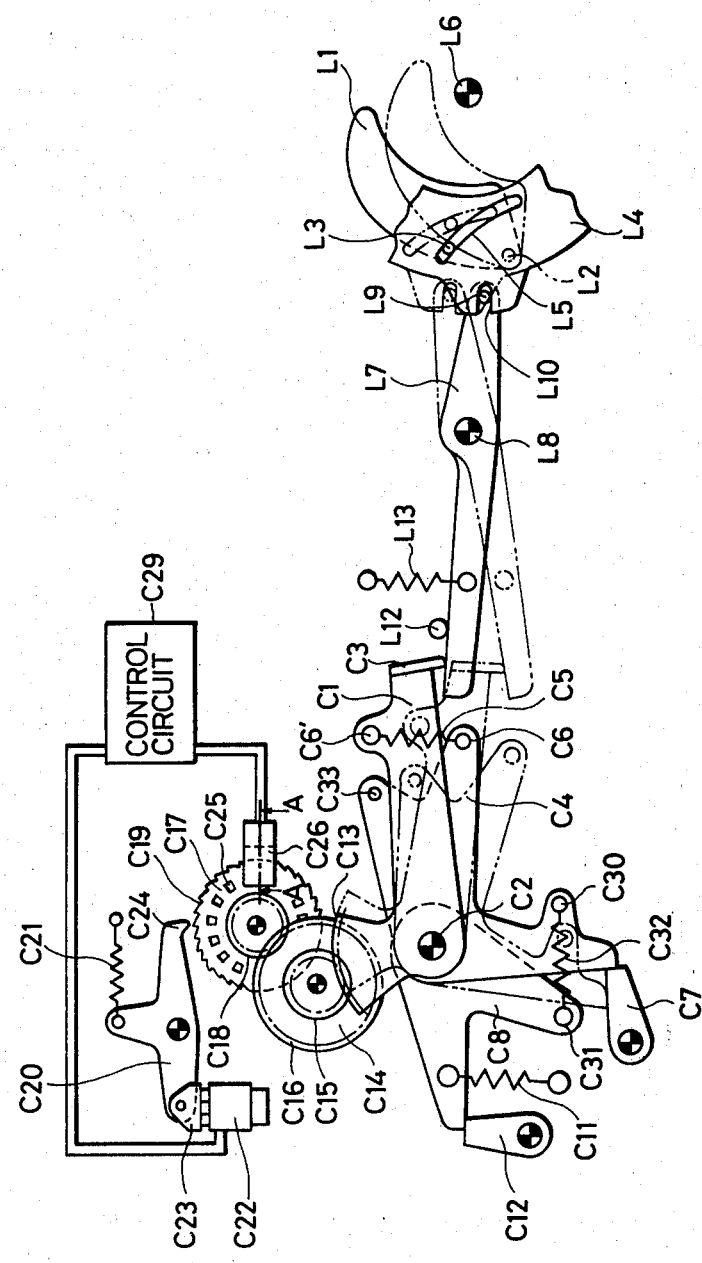
FIG. 3 is an explanatory diagram showing a state of an interchangeable lens single lens reflex camera, in which the lens is stopped down with an elastic force provided in the camera.

FIG. 3 shows another embodiment of the invention in a camera in which the lens is stopped down by an elastic force provided on the camera side. In FIG. 3, those components which have been previously described with reference to the first embodiment are therefore designated by similar reference characters, and the descriptions of those components similar in construction and operation to those in the first embodiment will be omitted.

A full-aperture spring L13 is connected between an aperture release member L7 and the lens mount, so that an aperture blade L1 is normally maintained fully open by the spring L13. A follow spring C5 connected between an aperture drive member C1 and an operating lever C4 is weaker than the full-aperture spring L13, and therefore one edge of the aperture release member L7 is maintained abutted against a stopper L12 at all times before the camera is released. A lens stopping spring C32 is connected between a spring hook C30 embedded in one end portion of the operating lever C4 and a spring hook 31 on a restoring lever C8 to urge the operating lever C4 to turn clockwise; however, before the camera release the operating lever C4 is locked in the position indicated in said outline by a locking member C7.

When the camera is released, the operating lever C4 is disengaged from the locking member C7. Therefore, a pin C33 embedded in another end portion of the operating lever C4 abuts against the aperture drive member C1 by means of the lens stopping spring C32, whereupon the latter C32 causes the operating lever C4 and the aperture drive member C1 to turn clockwise as one unit against the force of the full-aperture spring L13. As a result, the aperture release member L7 is turned counterclockwise to turn the aperture opening and closing ring L4 and accordingly the aperture blade L, whereby the lens is stopped down. The shutter is then operated, and when the shutter has been operated, a locking member C12 which has locked the restoring lever C8 is released. As a result, the restoring lever C8 is turned counterclockwise by the elastic force of a restoring spring C11, the spring hook C31 abuts against the edge of the operating lever C4, and therefore the operating lever C4 and the aperture drive member C1 are turned counterclockwise. Therefore, the edge of the aperture release member L7 abuts against the stopper L12, whereby the aperture blade L1 is fully opened again.

The operations of the accelerating gear train, the pulse generating board C17, the detector C26, the latch lever C20, the combination magnet C22 and the control circuit C29 in association with the above-described operation are carried out similarly as in the first embodiment.

As is apparent from the above description, the full-aperture spring L13 is stronger than the follow spring, and therefore when the lens is mounted on the camera one end portion of the aperture release member L7 is engaged with the aperture drive member C1 while being abutted against the stopper L12 at all times. Accordingly, even if a lens mounting error is caused, i.e. even if the aperture drive member C1 is shifted from its standard position by the aperture release member when the lens is mounted on the camera, the lens is stopped down correctly.

The difference between the embodiments shown in FIGS. 1 and 3 resides in that in the former embodiment the lens stopping operation is carried out with the spring provided in the lens, while in the latter embodiment the lens stopping operation is carried out with the spring provided in the camera. However, these embodiments are identical in the following points: The aperture release member is provided with the stopper at a start position from which the aperture release member is moved to stop down the lens, so that the aperture release member is not moved beyond the stopper. That is, the fully opened aperture remains constant. The follow spring is provided to cause the aperture drive member to follow and engage the aperture release member being moved. The pulse generating member is provided on the accelerating gear train operated in association with the aperture drive member, to provide electrical signals at the intervals of equal rotational angles, so that no matter from what position the aperture drive member is moved, the amount of its movement is correctly indicated by the electrical signals.

In the above-described embodiments, the pulse signals are generated by the variations of optical intensity provided by the pulse generating board C17 and the detector C26. However, such signals may be obtained from an electrical contact on-off operation, or from magnetic field variations which take place with a magnet or a Hall element.

The aperture control mechanism of the invention, being constructed as described above, has the following significant advantages:

(1) If the machining accuracies of the mating parts of the camera and the lens mount are not very high, then a lens mounting error may be caused when the lens is mounted on the camera; however, the aperture control accuracy is not affected by this lens mounting error.

(2) Since the camera's aperture drive member and the lens' aperture release member are relatively large in manufacturing tolerance, the manufacturing cost can be reduced.

(3) Even if the aperture drive member and the aperture release member are worn while being used, the aperture control accuracy is maintained.

What is claimed is:

1. In an interchangeable lens type single lens reflex camera of the type having a lens with aperture blades therein for defining a lens aperture, an aperture opening and closing ring for operating said aperture blades, and an aperture release member on said interchangeable lens, said release member being movable in first and second directions to drive said opening and closing ring to open and close said aperture blades, respectively, and an aperture drive member on said camera for controlling the position of said aperture release member, an aperture control mechanism comprising:

stopper means for limiting the movement of said aperture release member in said first direction to thereby define a fully open aperture position of said aperture release member and a start position of said aperture drive member;

means for moving said aperture drive member away from said start position; and control means for detecting the amount of movement of said aperture drive member from said start position and for stopping the movement of said aperture drive member to thereby stop said aperture release member at a position corresponding to a desired aperture.

2. The aperture control mechanism as claimed in claim 1, wherein said stopper means comprises a pin on said lens for engaging said aperture release member.

3. The aperture control mechanism as claimed in claim 1, wherein said means for moving includes aperture biasing means for urging one of said opening and closing ring and aperture release member in a direction to stop down said aperture.

4. The aperture control mechanism as claimed in claim 3, wherein said aperture biasing means comprises a spring engaging said aperture release member and biasing said aperture release member in said second direction.

5. The aperture control mechanism as claimed in claim 3 or 4, further comprising:

drive member bias means having a biasing force greater than that of said aperture biasing means for urging said aperture drive member against said aperture release member to urge said release member against said stopper means and thereby define said start position of said aperture drive member;

said means for moving comprising bias release means for releasing said drive member bias means to permit said aperture release member to move in said second direction, said aperture drive member moving away from said start position as said aperture release member moves in said second direction.

6. The aperture control mechanism as claimed in claim 5, wherein said drive member includes: a first member movable in a first direction for urging said aperture release member toward said stopper means and a second direction in which it allows said aperture release member to move away from said stopper means; a second member; and a follow spring coupling said first and second members, said second member movable in a first direction for pulling said first member in its first direction via said follow spring and in a second direction for allowing said first member to travel in its second direction, said second member being coupled to said drive member bias means.

7. The aperture control mechanism as claimed in claim 6, wherein said control means includes:

a gear train coupled to said first member;

a rotatable member having pulse generating means thereon and rotated by said gear train;

a detector confronting said rotatable member for detecting pulses from said pulse generating means and producing electrical signals in response thereto, said electrical signals being proportional to the movement distance of said first member; and latching means for stopping the rotation of said rotating member when a desired movement distance is detected, thereby stopping said aperture to a desired value.

* * * * *